(No Model.)
C. KNEBEL.
BAKER'S PEEL.
No. 604,619.   Patented May 24, 1898.
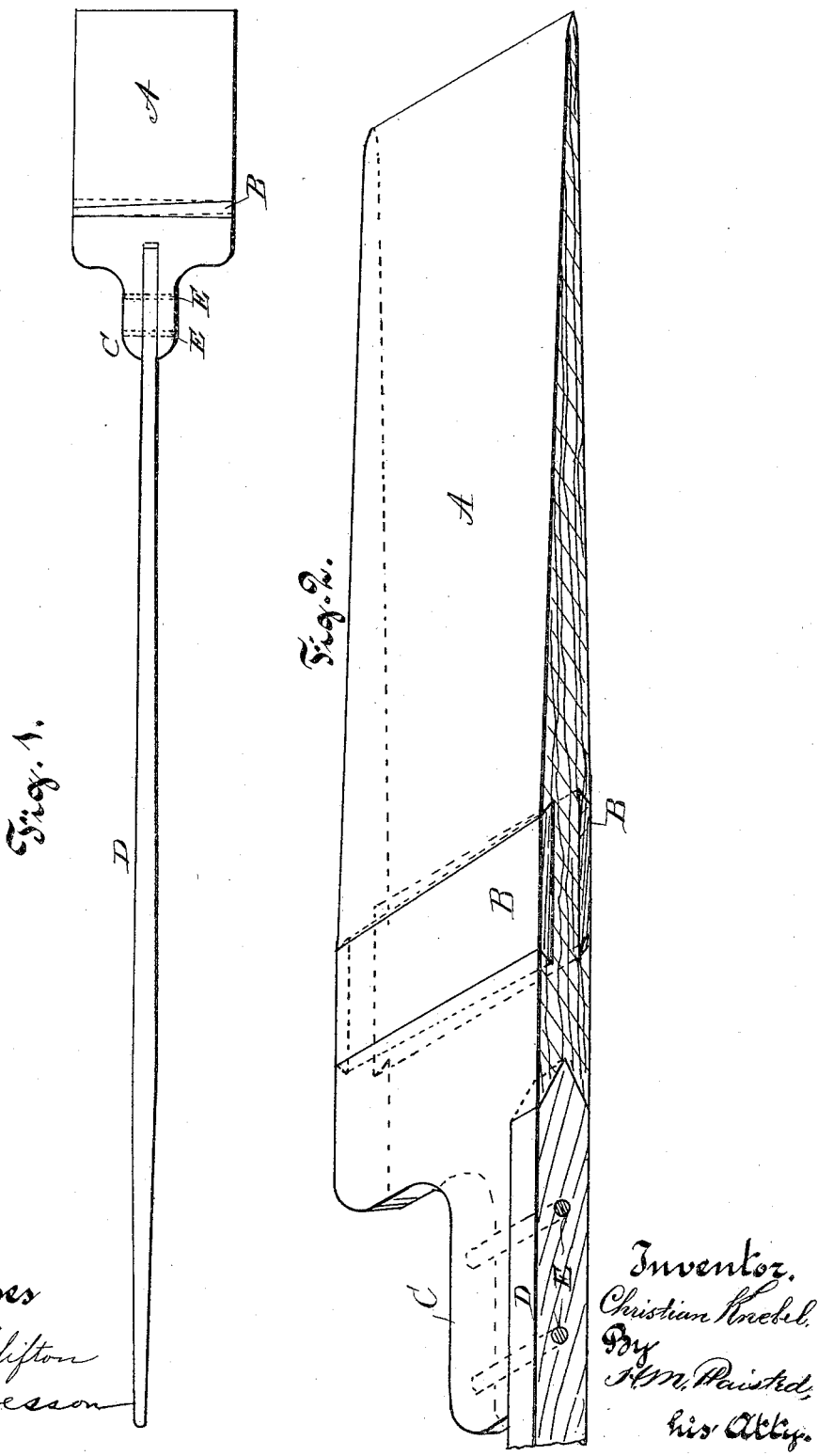
Witnesses
P. M. Clifton
F. G. Desson
Inventor.
Christian Knebel,
By
H. M. Paisted,
his Atty.

UNITED STATES PATENT OFFICE.

CHRISTIAN KNEBEL, OF ST. LOUIS, MISSOURI.

BAKER'S PEEL.

SPECIFICATION forming part of Letters Patent No. 604,619, dated May 24, 1898.

Application filed January 4, 1897. Serial No. 617,916. (No model.)

*To all whom it may concern:*

Be it known that I, CHRISTIAN KNEBEL, a citizen of the United States, residing at St. Louis, State of Missouri, have invented certain new and useful Improvements in Bakers' Peels, of which the following is a specification, reference being had therein to the accompanying drawings.

This invention relates to certain new and useful improvements in bakers' shovels, known as "peels."

The object of this invention is to prevent the shrinking, splitting, and falling to pieces of the blade of the bakers' shovels or peels under the heat of the baking-oven without impairing the surface of the blade.

The peculiarities of construction will be hereinafter fully described and claimed.

In the accompanying drawings, on which like reference-letters indicate corresponding parts, Figure 1 represents a face view of a baker's peel, and Fig. 2 an enlarged section and partial face view of a blade and portion of the handle.

A baker's peel is used to place the loaves of bread or cake within the baking-oven, and consists of a flat thin blade of wood secured to a long handle. The length of the blade proper is substantially twenty-four inches and the width varies from six to twenty-one inches. The handle is twelve to fourteen feet long, giving access to the rear of the baking-oven, the general depth of which is fourteen feet.

On account of the heat of the oven the peels heretofore made have been liable to warp, shrink, and split in use, as they are necessarily thinned down to a feather-edge at the end of the blade, and are made of wood, generally poplar, to prevent the bread from sticking thereto, as would be the case with the blades of metal.

Referring to the drawings, it will be seen that I cut a shallow groove B transversely across the top and bottom face of the blade A, preferably near its shoulders or thick portion, to which the handle is attached. This broad shallow groove is cut under at its edges and is preferably tapering from one edge of the blade to the other, and then a thin tapering strip, preferably of wood, dovetailed in cross-section, is firmly inserted in both faces of the blade and glued in place flush with the surface and forming part of it. Creases or cracks, wherein clogging particles of dough might lodge and sour, are avoided in my construction. The groove on one face of the blade tapers in the opposite direction from the groove on the other face, whereby wedge action of the strips upon the blade is equalized and the flat condition maintained.

The strip is preferably of considerable width, such as eight or ten times its thickness, and preferably of wood, so that the expansion of the strip and the blade under the heat of the oven will be the same. The taper from edge to edge allows the strip to be driven in tight, and if it should become loose it can be driven in farther and still wedge the blade securely. One or more of such wedge-strips may be used.

Above the shoulders the blade is narrowed and a slot cut between the jaws C, in which is fastened the end of the handle D by dowel-pins E, passing through the jaws and the handle, as shown in the drawings. The end of the handle is also tapered or tenoned to engage a matching socket in the blade, as shown in Fig. 2, securing firm connection between the handle and blade. This secures the end from working up and down, and it is preferably extended down into the body of the blade, and it will be kept flush with the surface.

It has been found by practical use that my improved baker's peel will last more than twice as long as an ordinary peel, and if by long usage or accident the blade becomes split the parts will be held together by the transverse strips B, before described. Extra lightness is also secured through my improvement, which is of evident advantage in this article of manufacture.

I do not confine my invention especially to any width or length of blade nor to the exact construction herein shown.

The jaws C are held firmly together and engaged with the end of the handle by the dowel-pins glued and driven therein, while the strips B, inserted in the body of the blade, bind the wider portion in one piece. The end of the handle running down past the dowel-pins into the portion of the blade opposite the shoulders is thus sure of a firm attachment to the blade, uninfluenced by any cracks or splitting of the feather-edge.

Having thus fully described my invention, what I claim as new, and desire to secure by Letters Patent, is—

A baker's peel consisting of the blade, having tapering dovetailed grooves formed on opposite sides, combined with tapering wedge-shaped strips which are forced into the grooves, the taper of the grooves and the strips being made to extend in opposite directions, upon opposite sides of the blade, whereby should the blade split, the two parts may be secured rigidly together by driving in the strips from opposite directions, substantially as shown and described.

In testimony whereof I affix my signature in presence of two witnesses.

CHRISTIAN KNEBEL.

Witnesses:
A. M. JOBST, Jr.,
B. H. STOLTMAN.